(12) United States Patent
Yamamoto et al.

(10) Patent No.: US 12,055,129 B2
(45) Date of Patent: Aug. 6, 2024

(54) LIGHTNING PROTECTION SYSTEM FOR WIND TURBINE BLADE AND WIND POWER GENERATION FACILITY, AND MONITORING METHOD FOR WIND TURBINE BLADE

(71) Applicant: MITSUBISHI HEAVY INDUSTRIES, LTD., Tokyo (JP)

(72) Inventors: Syusaku Yamamoto, Tokyo (JP); Tatsufumi Aoi, Tokyo (JP); Naoto Murata, Tokyo (JP); Yoichiro Tsumura, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/033,890

(22) PCT Filed: Nov. 17, 2021

(86) PCT No.: PCT/JP2021/042152
§ 371 (c)(1),
(2) Date: Apr. 26, 2023

(87) PCT Pub. No.: WO2022/107786
PCT Pub. Date: May 27, 2022

(65) Prior Publication Data
US 2023/0400012 A1 Dec. 14, 2023

(30) Foreign Application Priority Data
Nov. 19, 2020 (JP) .................................. 2020-192732

(51) Int. Cl.
*F03D 80/30* (2016.01)
*F03D 1/06* (2006.01)

(52) U.S. Cl.
CPC .......... *F03D 80/301* (2023.08); *F03D 1/0688* (2023.08)

(58) Field of Classification Search
CPC ...... F03D 80/30; F03D 80/301; F03D 1/0688; B64D 45/02
See application file for complete search history.

(56) References Cited

U.S. PATENT DOCUMENTS 7,508,186 B2 * 3/2009 Mortensen ............. H02G 13/80
324/72
8,258,773 B2   9/2012 Brnada
(Continued)

FOREIGN PATENT DOCUMENTS

DE   102015115190 A1 * 3/2017
EP       2623773 A2    8/2013
(Continued)

OTHER PUBLICATIONS

International Search Report issued in corresponding International (PCT) Application No. PCT/JP2021/042152 dated Jan. 11, 2022 (11 pages).
(Continued)

*Primary Examiner* — Topaz L. Elliott
(74) *Attorney, Agent, or Firm* — Osha Bergman Watanabe & Burton LLP

(57) ABSTRACT

A lightning protection system for a wind turbine blade, includes: a receptor disposed in a tip portion of the wind turbine blade; a leading edge protection portion made of a metal and electrically connected to the receptor and disposed so as to cover a leading edge of the wind turbine blade; a down conductor connected to the receptor; at least one connecting conductor for electrically connecting the leading edge protection portion and the down conductor at a position between the receptor and a blade root in a blade spanwise direction of the wind turbine blade; and a first current sensor
(Continued)

for measuring a current flowing through a blade tip-side portion which is a portion, of the down conductor, between a blade tip and a connection point with the at least one connecting conductor in the blade spanwise direction.

17 Claims, 14 Drawing Sheets

(56) References Cited

U.S. PATENT DOCUMENTS

| | | | | |
|---|---|---|---|---|
| 8,517,681 | B2* | 8/2013 | Naka | F03D 80/30 416/1 |
| 2006/0126252 | A1* | 6/2006 | Mortensen | F03D 80/30 361/118 |
| 2007/0041834 | A1* | 2/2007 | Schram | F03D 17/00 416/61 |
| 2008/0181775 | A1* | 7/2008 | Livingston | F03D 1/0675 416/224 |
| 2011/0182731 | A1* | 7/2011 | Naka | F03D 80/30 416/1 |
| 2011/0267027 | A1* | 11/2011 | Iannotti | F03D 80/30 324/72 |
| 2012/0025804 | A1* | 2/2012 | Brnada | G01R 15/18 324/72 |
| 2012/0133146 | A1 | 5/2012 | Naka et al. | |
| 2016/0348643 | A1 | 12/2016 | Fujioka et al. | |
| 2019/0383272 | A1* | 12/2019 | Murata | F03D 80/30 |
| 2020/0173423 | A1 | 6/2020 | Kirkegaard et al. | |
| 2021/0372374 | A1 | 12/2021 | Murata et al. | |
| 2023/0358207 | A1* | 11/2023 | Mukherjee | F03D 80/30 |

FOREIGN PATENT DOCUMENTS

| | | | | |
|---|---|---|---|---|
| GB | 2481842 A | * | 1/2012 | ......... B29C 65/4835 |
| JP | 2000-206100 A | | 7/2000 | |
| JP | 2012-117446 A | | 6/2012 | |
| JP | 2013-155723 A | | 8/2013 | |
| JP | 2016-223325 A | | 12/2016 | |
| JP | 2017-020423 A | | 1/2017 | |
| JP | 2017-082689 A | | 5/2017 | |
| JP | 2017-096193 A | | 6/2017 | |
| JP | 2019-120219 A | | 7/2019 | |
| JP | 2020-526699 A | | 8/2020 | |
| JP | 2021-188577 A | | 12/2021 | |
| WO | WO-2013007267 A1 | * | 1/2013 | ........... F03D 1/0675 |

OTHER PUBLICATIONS

International Preliminary Report on Patentability Issued in corresponding International (PCT) Application No. PCT/JP2021/042152, mailed on Jun. 1, 2023. (15 Pages with English Translation).
Extended European Search Report issued in counterpart European Application No. 21894660.6, dated Mar. 15, 2024 (9 pages).

* cited by examiner

LIGHTNING PROTECTION SYSTEM FOR WIND TURBINE BLADE AND WIND POWER GENERATION FACILITY, AND MONITORING METHOD FOR WIND TURBINE BLADE

TECHNICAL FIELD

The present disclosure relates to a lightning protection system for a wind turbine blade and a wind power generation facility, and a monitoring method for the wind turbine blade.

This application claims the priority of Japanese Patent Application No. 2020-192732 filed on Nov. 19, 2020, the content of which is incorporated herein by reference.

BACKGROUND

Various devices or systems have been proposed to protect a wind turbine blade from lightning.

For example, Patent Document 1 discloses a lightning strike detection system for a wind turbine blade provided with a plurality of receptors (lightning receivers). The lightning strike detection system includes a plurality of current sensors respectively provided in correspondence with the plurality of receptors. The plurality of current sensors respectively detect currents flowing through branch lines (conductors) respectively connecting between the plurality of receptors and conductors (down conductors) extending inside the wind turbine blades. Then, based on detection results in the plurality of current sensors, the system detects that the wind turbine blade has been struck by lightning and identifies the lightning-struck receptor.

CITATION LIST

Patent Literature

Patent Document 1: U.S. Pat. No. 8,258,773B

SUMMARY

Technical Problem

Meanwhile, erosion may occur in a rotating wind turbine blade due to, for example, collision of raindrops, sand dust, or the like on a leading edge portion of the wind turbine blade. In order to suppress such erosion, a leading edge protection portion made of a metal may be provided in the leading edge portion of the wind turbine blade. In order to more reliably suppress the erosion of the wind turbine blade, the leading edge protection portion is usually disposed such that there is no gap between the leading edge protection portion and the receptor disposed in a tip portion of the wind turbine blade, that is, such that the leading edge protection portion is electrically connected to the receptor.

Identifying lightning-struck portion of the wind turbine blade is important for early identification and repair of a lightning-damaged portion. On the other hand, in the case of the wind turbine blade provided with the leading edge protection portion made of a metal described above, since the leading edge protection portion and the receptor are electrically connected, it is difficult to identify the lightning-struck portion of the wind turbine blade when lightning strikes, and, for example, it is difficult to identify whether the lightning has struck the receptor or the leading edge protection portion.

In view of the above, an object of at least one embodiment of the present invention is to provide a lightning protection system for a wind turbine blade and a wind power generation facility, and a monitoring method for the wind turbine blade, which are capable of appropriately identifying a lightning-struck position in the wind turbine blade.

Solution to Problem

A lightning protection system for a wind turbine blade according to at least one embodiment of the present invention, includes: a receptor disposed in a tip portion of the wind turbine blade; a leading edge protection portion made of a metal and electrically connected to the receptor and disposed so as to cover a leading edge of the wind turbine blade; a down conductor connected to the receptor; and at least one connecting conductor for electrically connecting the leading edge protection portion and the down conductor at a position between the receptor and a blade root in a blade spanwise direction of the wind turbine blade; a first current sensor for measuring a current flowing through a portion, of the down conductor, between a blade tip and a connection point with the at least one connecting conductor in the blade spanwise direction; at least one second current sensor disposed corresponding to the at least one connecting conductor, the at least one second current sensor being configured to measure a current flowing through a portion, of the down conductor, between the blade root and the connection point; and an identification part configured to identify a lightning-struck portion of the wind turbine blade based on a first current measured value which is a current measured value by the first current sensor and a second current measured value which is a current measured value by the second current sensor.

Further, a wind power generation facility according to at least one embodiment of the present invention includes: a wind turbine rotor including a wind turbine blade; a generator configured to be driven by rotation of the wind turbine rotor; and the above-described lightning protection system.

Furthermore, a monitoring method for a wind turbine blade according to at least one embodiment of the present invention is a monitoring method for a wind turbine including: a receptor disposed in a tip portion of the wind turbine blade; a leading edge protection portion made of a metal and electrically connected to the receptor and disposed so as to cover a leading edge of the wind turbine blade; a down conductor connected to the receptor; and a connecting conductor for electrically connecting the leading edge protection portion and the down conductor at a position between the receptor and a blade root in a blade spanwise direction of the wind turbine blade, the monitoring method for the wind turbine blade, including: a step of measuring, with a first current sensor, a current flowing through a portion, of the down conductor, between a blade tip and a connection point with the connecting conductor in the blade spanwise direction; a step of measuring, with a second current sensor, a current flowing through a portion, of the down conductor, between the blade root and the connection point; and a step of identifying a lightning-struck portion of the wind turbine blade based on a first current measured value by the first current sensor and a second current measured value by the second current sensor.

Furthermore, a monitoring method for a wind turbine blade according to at least one embodiment of the present invention is a monitoring method for a wind turbine including: a receptor disposed in a tip portion of the wind turbine blade; a leading edge protection portion made of a metal and electrically connected to the receptor and disposed so as to cover a leading edge of the wind turbine blade; a down conductor connected to the receptor; and a connecting conductor for electrically connecting the leading edge protection portion and the down conductor at a position between the receptor and a blade root in a blade spanwise direction of the wind turbine blade, the monitoring method for the wind turbine blade, including: a step of measuring, with a second current sensor, a current flowing through a portion, of the down conductor, between the blade root and a connection point with the connecting conductor; a step of acquiring a current waveform indicating a time change of a second current measured value by the second current sensor; and a step of identifying a lightning-struck portion of the wind turbine blade based on the current waveform.

Advantageous Effects

According to at least one embodiment of the present invention, provided are a lightning protection system for a wind turbine blade and a wind power generation facility, and a monitoring method for the wind turbine blade, which are capable of appropriately identifying a lightning-struck position in the wind turbine blade.

DETAILED DESCRIPTION

Figure 1:
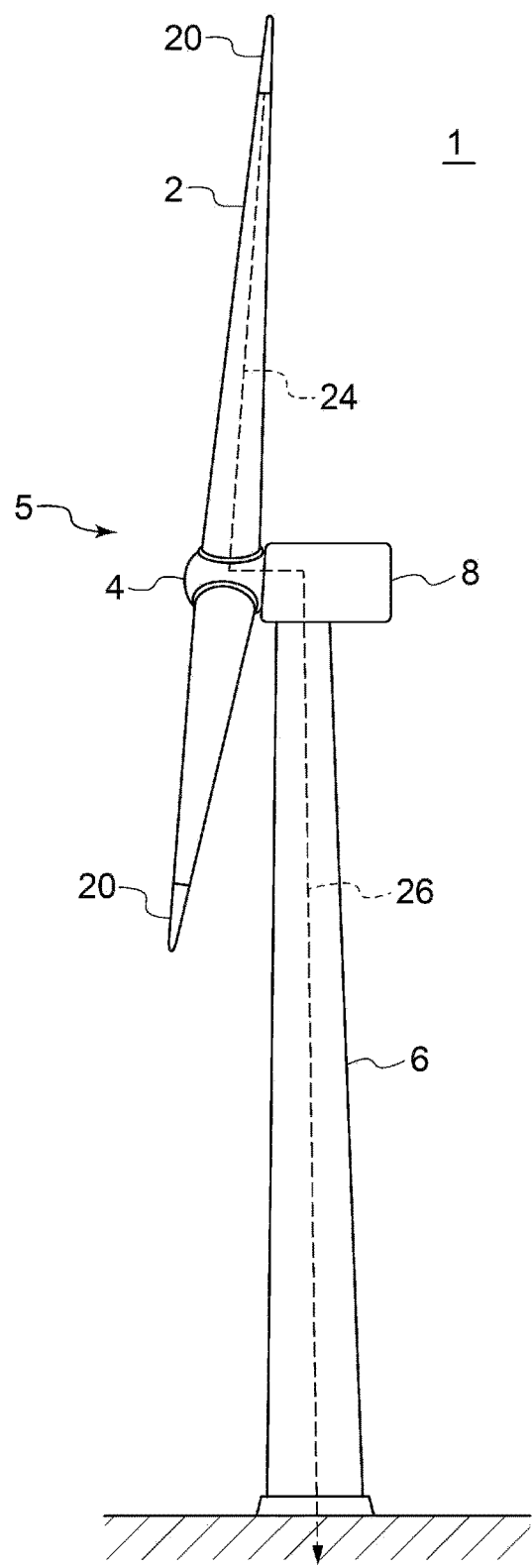
FIG. 1 is a schematic view of a wind power generation facility including a wind turbine blade to which a lightning protection system is applied according to an embodiment.

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.
(Configurations of Wind Power Generation Facility and Wind Turbine Blade)

Figure 2:
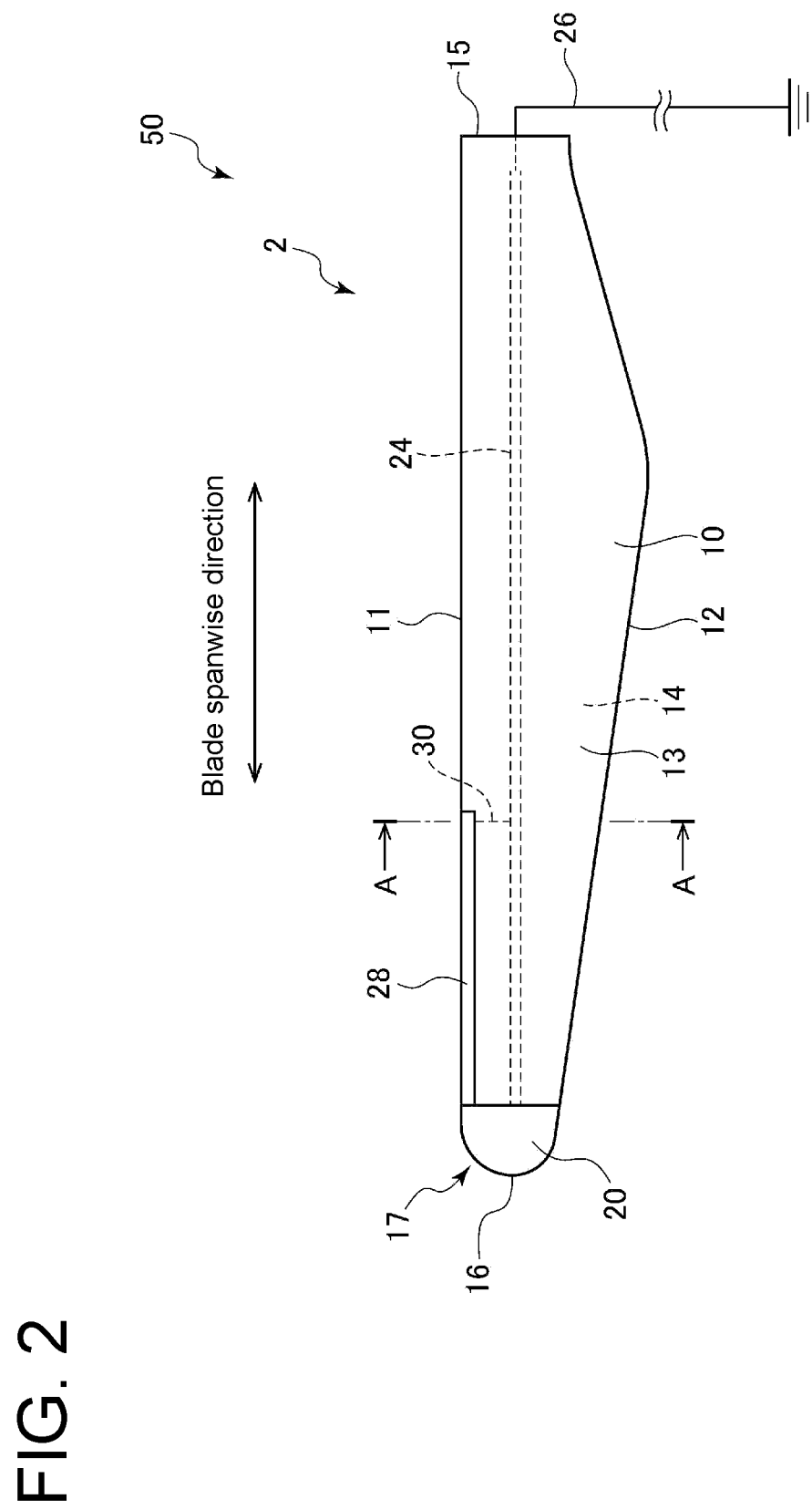
FIG. 2 is a schematic view of the wind turbine blade to which the lightning protection system is applied according to an embodiment.
Figure 3:
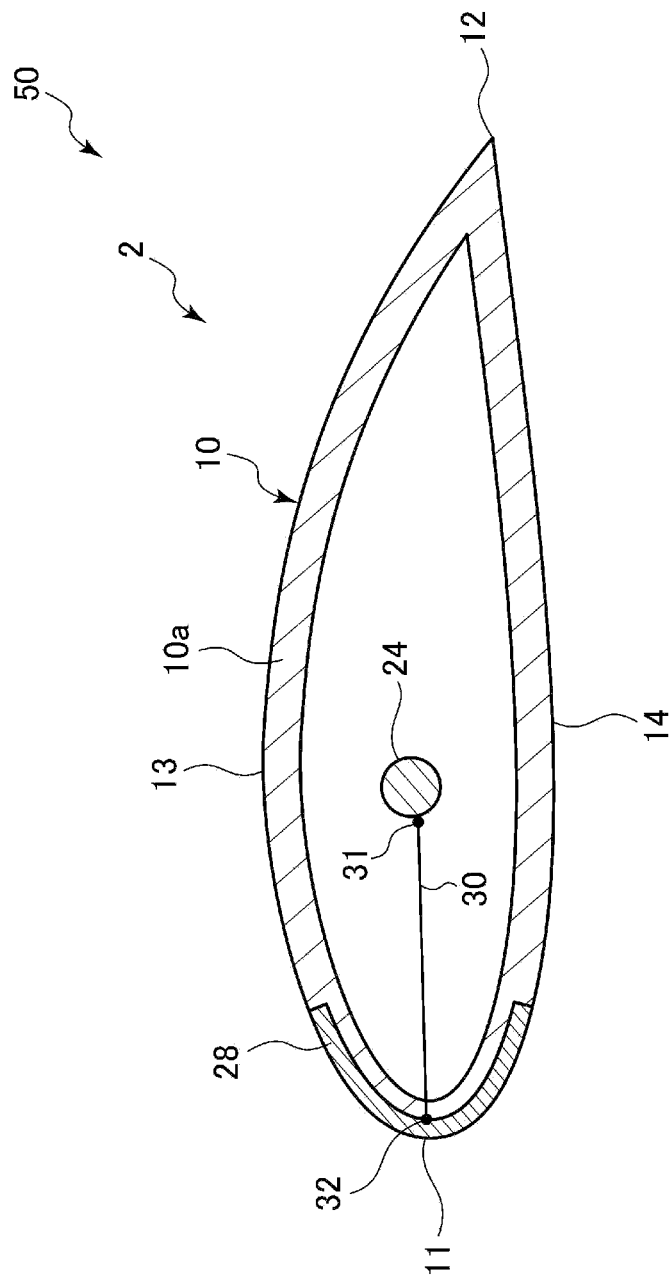
FIG. 3 is a schematic view of the wind turbine blade and the lightning protection system according to an embodiment, and is the view showing a cross section taken along line A-A in FIG. 2.
Figure 4:
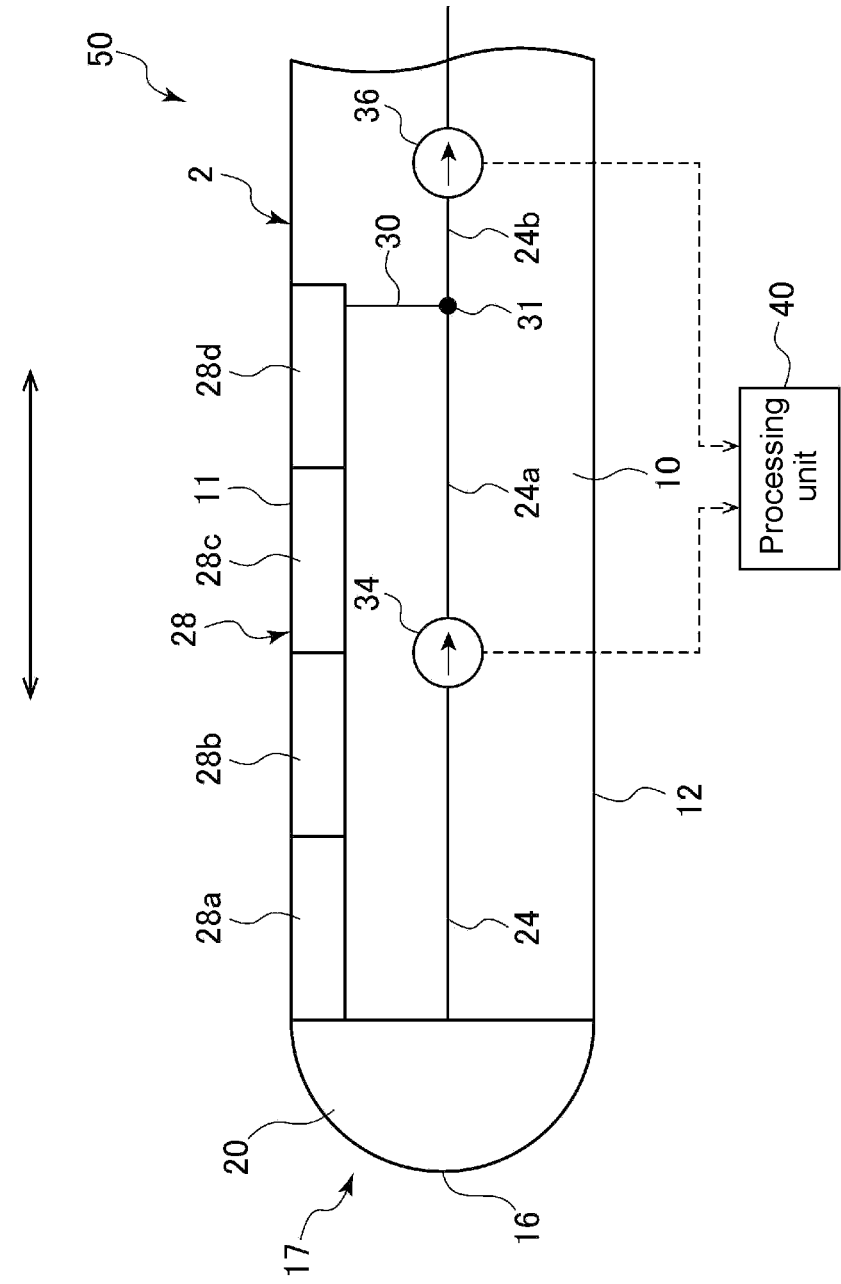
FIG. 4 is a schematic view of the wind turbine blade and the lightning protection system according to an embodiment.

FIG. 1 is a schematic view of a wind power generation facility including a wind turbine blade to which a lightning protection system is applied according to an embodiment. FIG. 2 is a schematic view of the wind turbine blade to which the lightning protection system is applied according to an embodiment. FIGS. 3 and 4 are each a schematic view of the wind turbine blade and the lightning protection system according to an embodiment. FIG. 3 is a cross-sectional view taken along line A-A in FIG. 2, and FIG. 4 is the schematic view of a section including a blade tip portion of the wind turbine blade shown in FIG. 2.

As shown in FIG. 1, a wind power generation facility 1 includes a rotor (wind turbine rotor) 5 composed of at least one (for example, three) wind turbine blade 2 and a hub 4. The wind turbine blade 2 is radially mounted on a hub 4, and the wind turbine blade 2 is configured to receive wind to rotate the rotor 5 and is configured to drive a generator (not shown) connected to the rotor 5. In the embodiment shown in FIG. 1, the rotor 5 is supported by a nacelle 8 disposed on an upper side of a tower 6. The tower 6 may be disposed upright on a base structure, such as a foundation structure or a floating structure, disposed on water or on land.

As shown in FIG. 2, the wind turbine blade 2 includes a blade root 15 mounted on the hub 4 of the wind power generation facility 1, a blade tip 16 located farthest from the hub 4, and an airfoil portion extending between the blade root 15 and the blade tip 16. Further, as shown in FIGS. 2 to 4, the wind turbine blade 2 has a leading edge 11 and a trailing edge 12 extending along a blade spanwise direction from the blade root 15 to the blade tip 16. Furthermore, an outer shape of the wind turbine blade 2 is formed by a suction surface (convex surface) 13 and a pressure surface (concave surface) 14.

As shown in FIGS. 2 to 4, the wind turbine blade 2 includes a blade body 10 including a shell (envelope) 10a (see FIG. 3) and forming most of the outer shape of the wind turbine blade 2. The blade body 10 may be formed from fiber reinforced plastic.
(Configuration of Lightning Protection System for Wind Turbine Blade)

The wind power generation facility 1 includes a lightning protection system 50 described below. As shown in FIGS. 2 to 4, the lightning protection system 50 according to an embodiment includes a receptor (lightning receiver) 20 disposed on the wind turbine blade 2, a leading edge protection portion 28, a down conductor 24, and at least one connecting conductor 30. Further, as shown in FIG. 4, the lightning protection system 50 according to an embodiment includes a first current sensor 34, a second current sensor 36, and a processing unit for receiving and processing signals indicating measurement results by the first current sensor 34 and the second current sensor.

The receptor 20 is disposed in a tip portion 17 (a region including the blade tip 16) of the wind turbine blade 2. In the present specification, the tip portion 17 of the wind turbine blade 2 refers to a region closer to the blade tip 16 than a central position between the blade root 15 and the blade tip 16 in the blade spanwise direction.

The receptor 20 is formed from an electrically conductive material, and is typically made of a metal. In the exemplary embodiments shown in FIGS. 2 to 4, the receptor 20 forms a portion, of the wind turbine blade 2, including the blade tip 16. In another embodiment, the receptor 20 may be disposed at a position closer to the blade root 15 side than the blade tip 16 in the blade spanwise direction, in the tip portion 17.

The leading edge protection portion 28 is disposed so as to cover the leading edge 11 of the blade body 10. Further, the leading edge protection portion 28 is disposed so as to extend along the blade spanwise direction. The leading edge protection portion 28 is made of a metal and electrically connected to the receptor 20. The leading edge protection portion 28 may be disposed so as to partially overlap the receptor 20 in the blade spanwise direction. The leading edge protection portion 28 may be attached to the blade body 10 by using a fastening member such as a bolt or joining means such as an adhesive material.

As shown in FIG. 4, the leading edge protection portion 28 may include a plurality of leading edge protection members 28a to 28d arranged along the blade spanwise direction. FIG. 4 shows the leading edge protection portion 28 including the four leading edge protection members 28a to 28d as an example, but the number of leading edge protection members constituting the leading edge protection portion 28 is not limited. The plurality of leading edge protection members 28a to 28d are disposed such that a pair of adjacent leading edge protection members among the plurality of leading edge protection members 28a to 28d are electrically connected.

The down conductor 24 is electrically connected to the receptor 20. The down conductor 24 is constituted by, for example, a conducting wire. The down conductor 24 is disposed so as to extend along the blade spanwise direction of the wind turbine blade 2. The down conductor 24 may be disposed inside the blade body 10 as shown in FIGS. 2 and 3, or may be disposed along a surface of the blade body 10. As shown in FIGS. 1 and 2, the down conductor 24 is connected to a down conductor 26 extending inside the tower 6. A lightning current when lightning strikes the wind turbine blade 2 (the receptor 20, the leading edge protection portion 28, or the like) is guided to the outside of the wind power generation facility 1 on the earth (ground) or the like via the down conductor 24 and the down conductor 26.

The connecting conductor 30 is disposed so as to electrically connect the leading edge protection portion 28 and the down conductor 24 at a position between the receptor 20 and the blade root 15 in the blade spanwise direction. As shown in FIG. 3, the connecting conductor 30 may be disposed so as to penetrate the blade body 10 (shell 10a) and extend inside the blade body 10. As shown in FIG. 3, a connection point 31 with the down conductor 24 is formed on one end side of the connecting conductor 30, and a connection point 32 with the leading edge protection portion 28 is formed on another end side of the connecting conductor 30.

In the exemplary embodiment shown in FIG. 4, the leading edge protection member 28d, which is located closest to the blade root among the leading edge protection members 28a to 28d, and the down conductor 24 are connected to each other via the connecting conductor 30.

The first current sensor 34 is configured to measure a current flowing through a portion 24a, of the down conductor 24, between the blade tip and the connection point 31 with the connecting conductor 30 in the blade spanwise direction. The second current sensor 36 is disposed corresponding to the connecting conductor 30, and is configured to measure a current flowing through a portion 24b, of the down conductor 24, between the blade root 15 and the connection point 31.

As the first current sensor 34 and the second current sensor 36, a sensor having effective responsiveness to a frequency component of the lightning current can preferably be used. As the first current sensor 34 and the second current sensor 36, for example, a Rogowski sensor, an optical fiber ammeter, or the like can be used.

Figure 6:
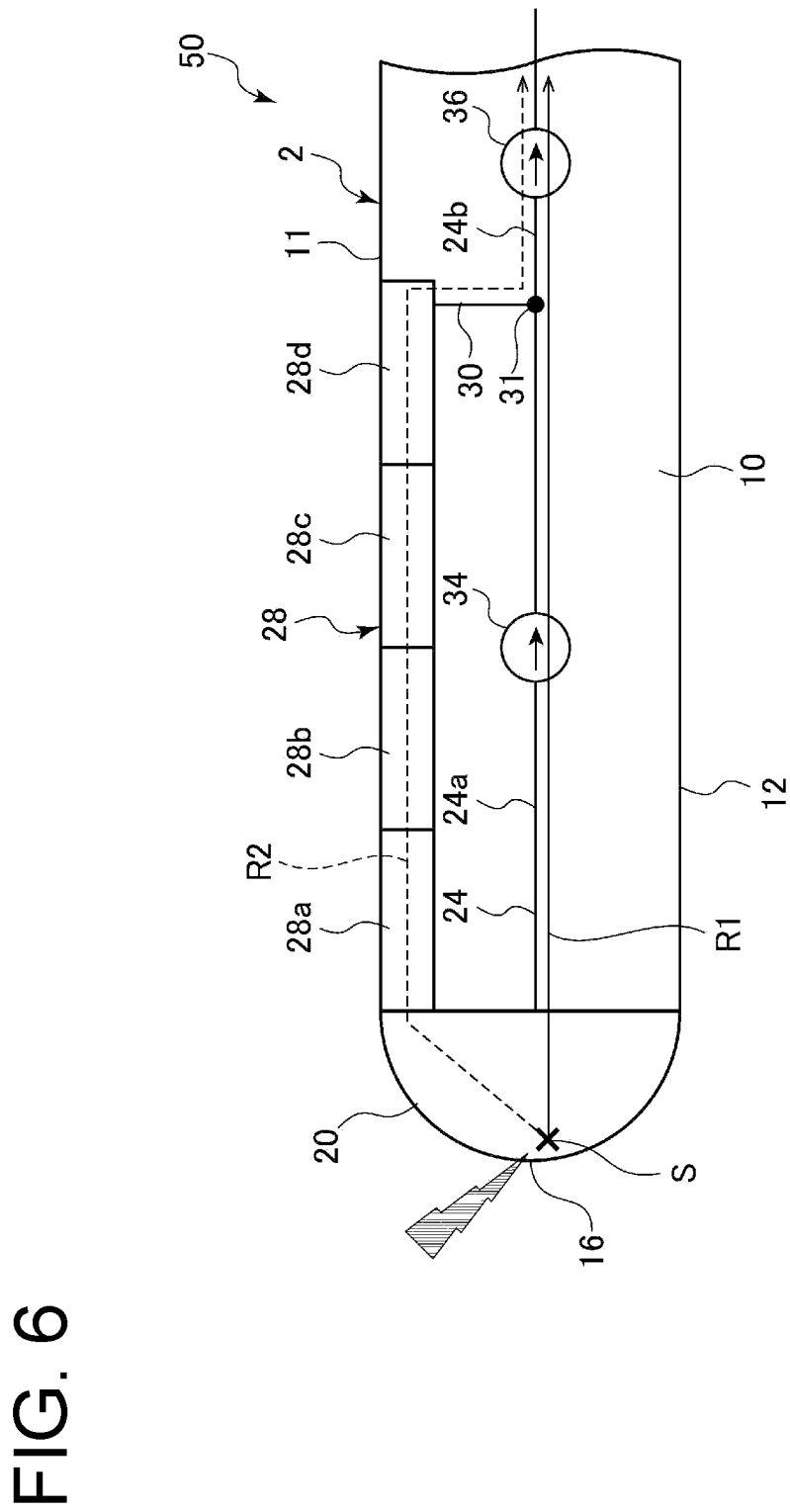
FIG. 6 is a view for describing an operation example of the lightning protection system shown in FIG. 4.
Figure 7:
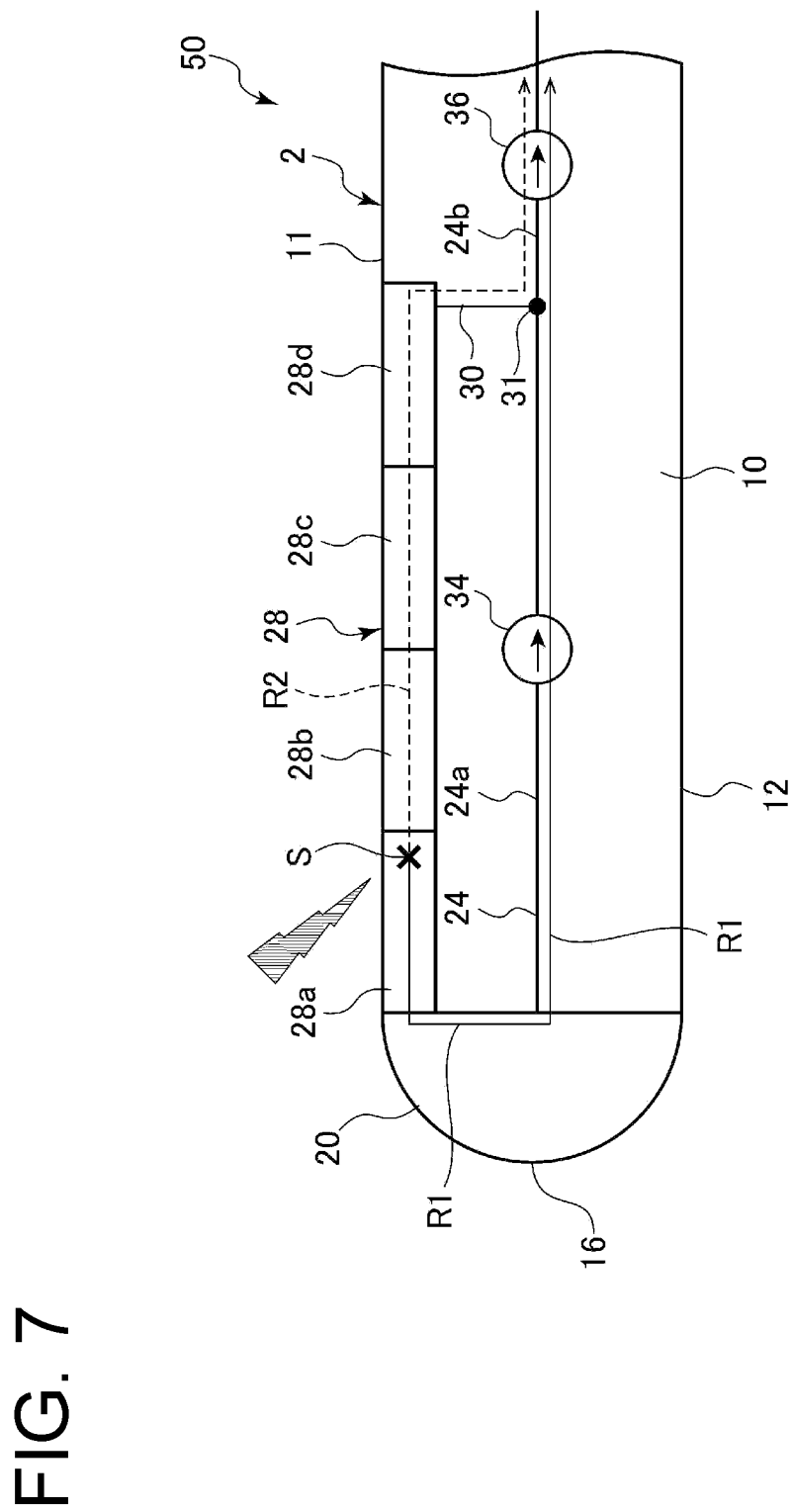
FIG. 7 is a view for describing an operation example of the lightning protection system shown in FIG. 4.
Figure 8:
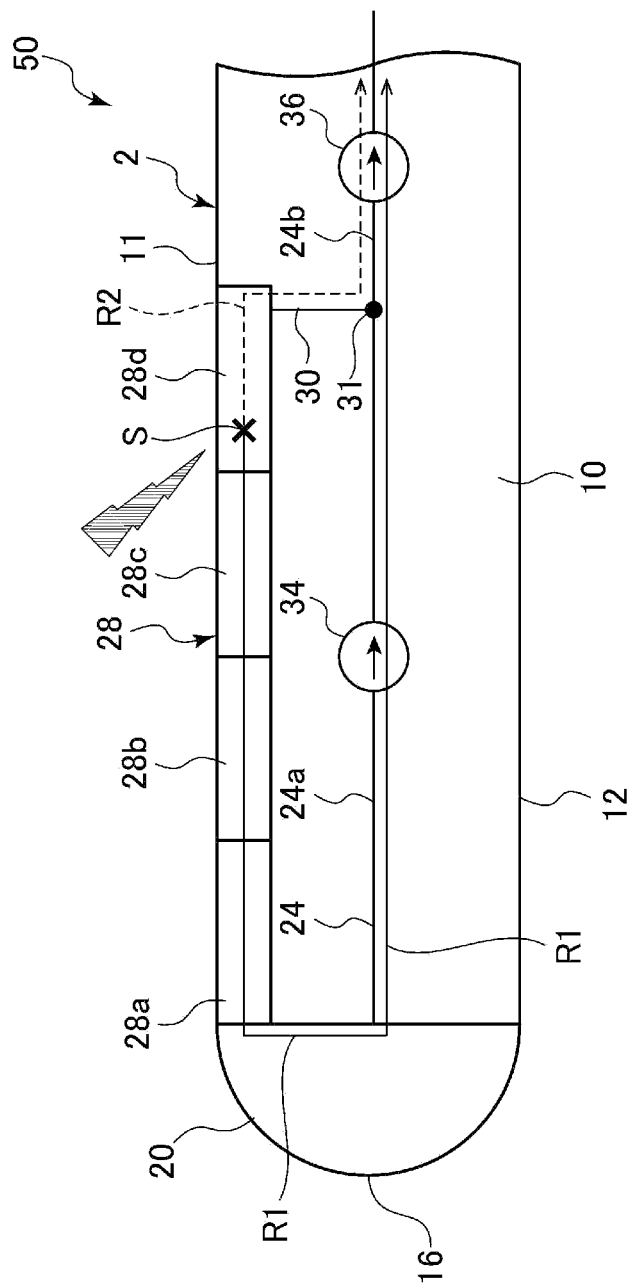
FIG. 8 is a view for describing an operation example of the lightning protection system shown in FIG. 4.

Herein, FIGS. 6 to 8 are each a view for describing an operation example of the wind turbine blade and the lightning protection system shown in FIG. 4, and FIGS. 9 to 11 are each a view for describing an operation example of the wind turbine blade and the lightning protection system according to another embodiment.

Figure 9:
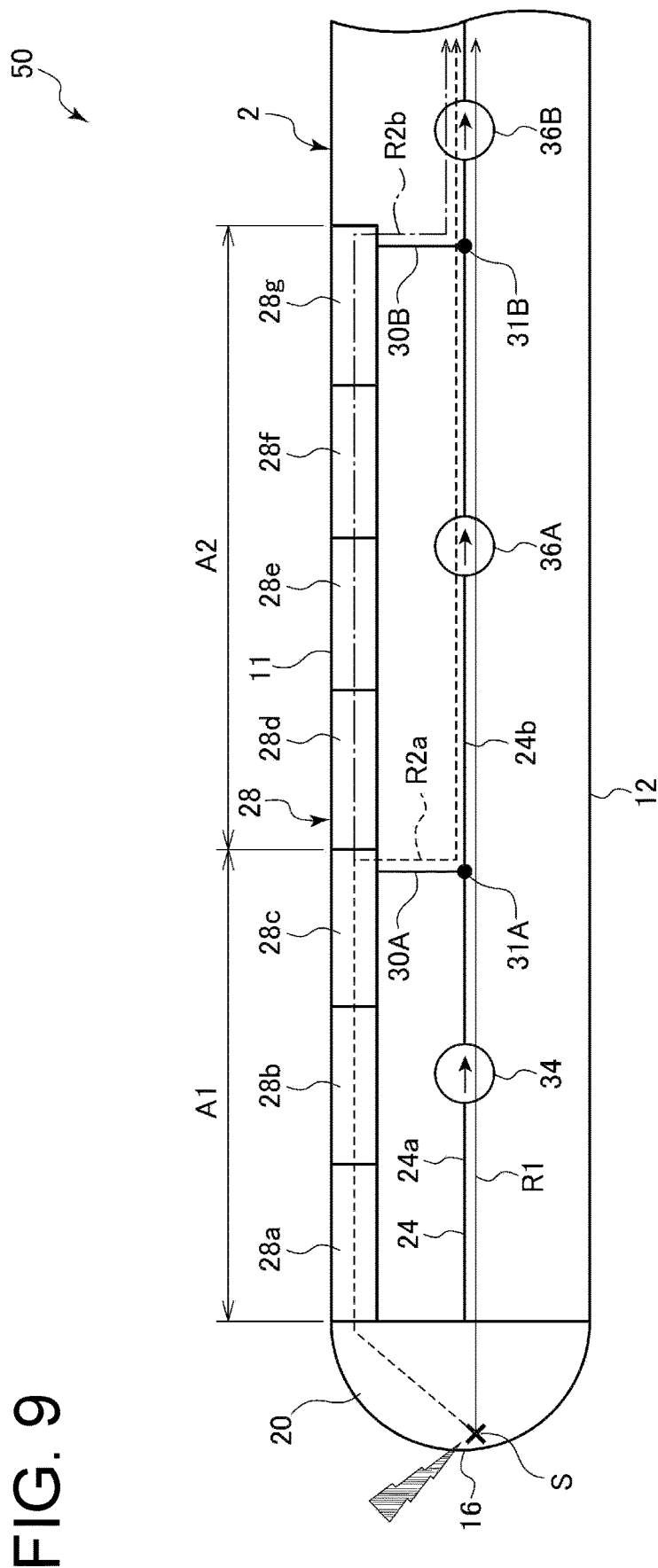
FIG. 9 is a view for describing an operation example of the lightning protection system according to an embodiment.
Figure 10:
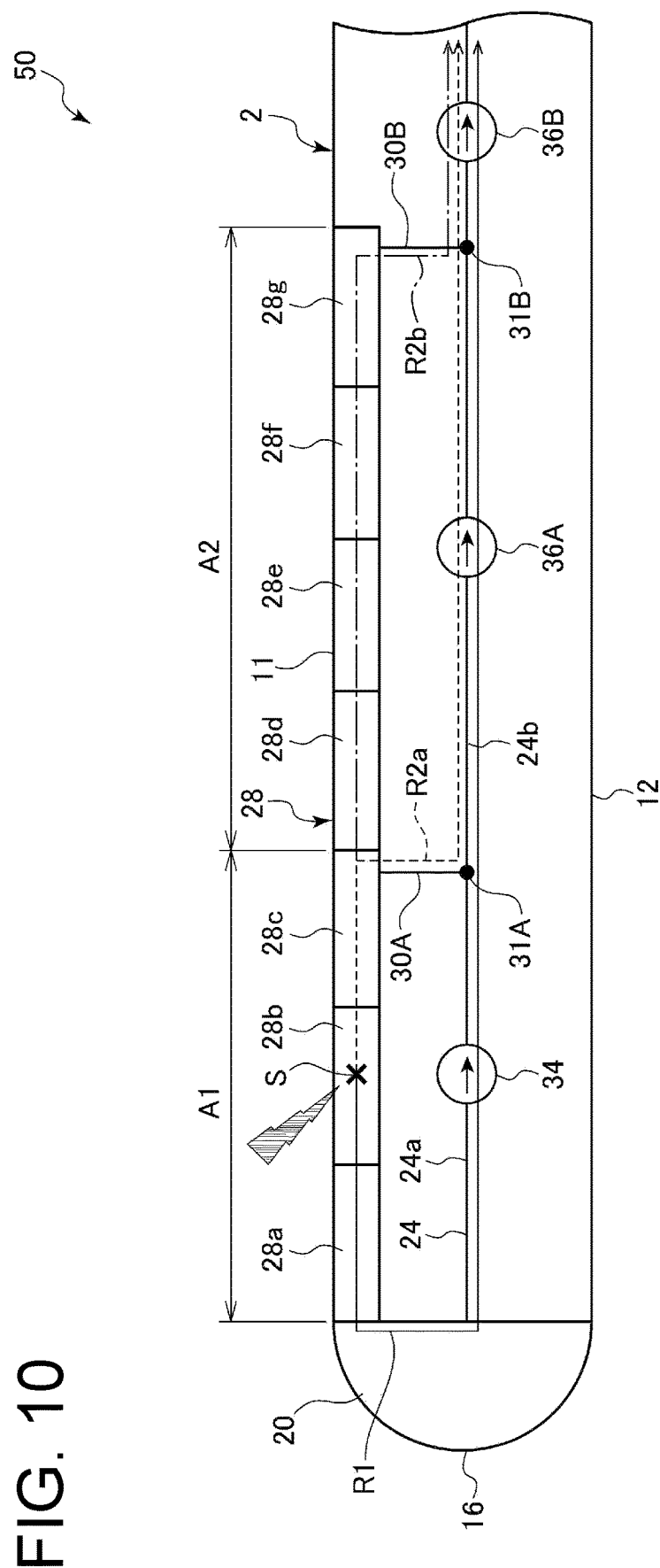
FIG. 10 is a view for describing an operation example of the lightning protection system according to an embodiment.
Figure 11:
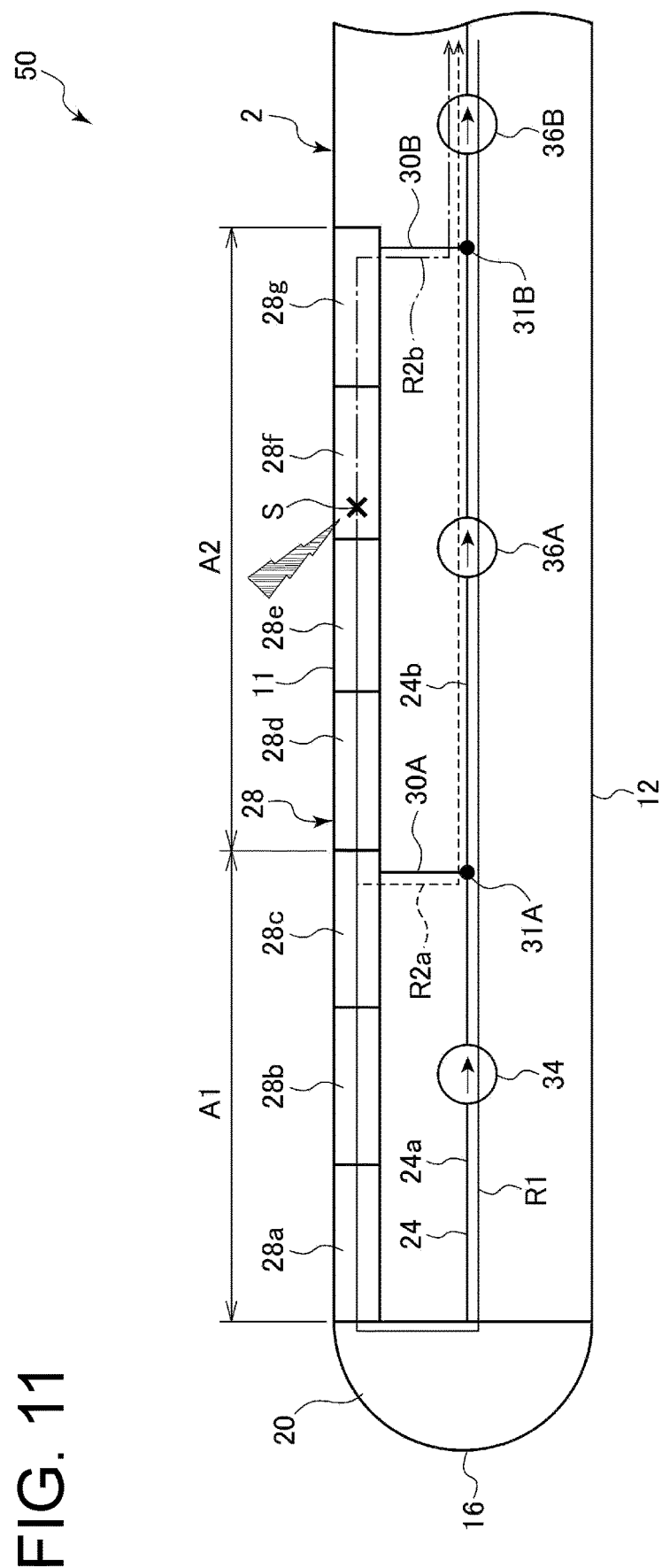
FIG. 11 is a view for describing an operation example of the lightning protection system according to an embodiment.

As shown in FIGS. 9 to 11, the lightning protection system 50 may include the plurality of connecting conductors 30. In the examples shown in FIGS. 9 to 11, the lightning protection system 50 includes the leading edge protection portion 28 including the plurality of leading edge protection members 28a to 28g, two connecting conductors 30A, 30B, and two second current sensors 36A, 36B disposed corresponding to the two connecting conductors 30A, respectively.

The connecting conductor 30A is disposed so as to connect the down conductor 24 to, among the plurality of leading edge protection members 28a to 28g, the leading edge protection member 28c located closer to the blade root 15 in the blade spanwise direction than the leading edge protection member 28a disposed closest to the blade tip 16. The connecting conductor 30B is disposed so as to connect the down conductor 24 to, among the plurality of leading edge protection members 28a to 28g, the leading edge protection member 28g located closer to the blade root 15 in the blade spanwise direction than the leading edge protection member 28c connected to the connecting conductor 30A.

The second current sensor 36A is configured to measure a current flowing through a portion, of the down conductor 24, between the blade root 15 and the connection point 31A of the connecting conductor 30A with the down conductor 24 and between the blade tip 16 and a connection point 31B of the connecting conductor 30B with the down conductor 24. The second current sensor 36B is configured to measure a current flowing through a portion, of the down conductor 24, between the blade root 15 and the connection point 31B of the connecting conductor 30B with the down conductor 24.

In some embodiments, the lightning protection system 50 may include a temperature measurement part 38 (see FIG. 5) configured to measure a temperature distribution of the leading edge protection portion 28. The temperature measurement part 38 may be, for example, an infrared thermography. The temperature measurement part 38 may be mounted on the wind turbine blade 2, the hub 4, the nacelle 8, or the tower 6, or may be disposed at a position away from these.

Figure 5:
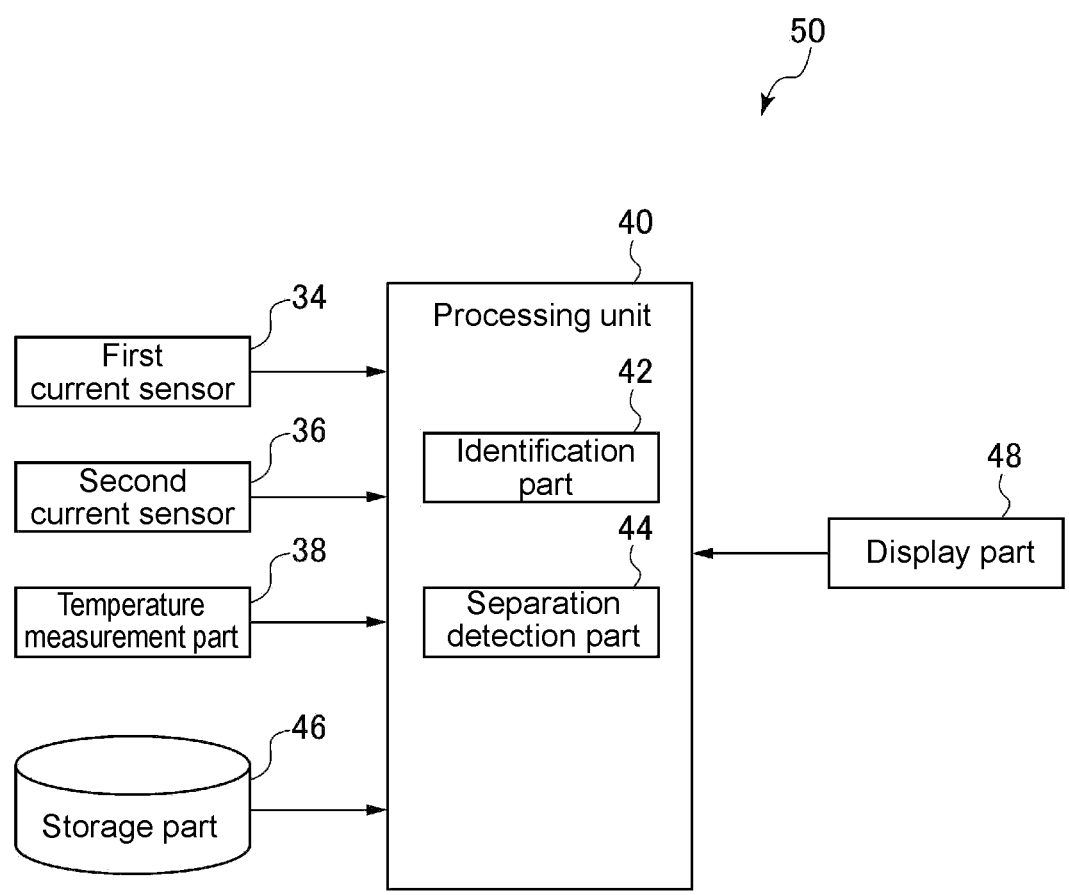
FIG. 5 is a schematic configuration diagram of a lightning protection system 50 according to an embodiment.

FIG. 5 is a schematic configuration diagram of the lightning protection system 50 according to an embodiment. As shown in FIG. 5, the processing unit 40 for the lightning protection system 50 according to an embodiment includes an identification part 42 for identifying the lightning-struck portion of the wind turbine blade 2 based on the current measured values by the first current sensor 34 and the second current sensor 36, and/or a separation detection part 44 for detecting separation of the leading edge protection portion 28 in the wind turbine blade 2 based on the temperature measurement result by the temperature measurement part 38.

The identification result by the identification part 42 and/or the detection result by the separation detection part 44 may be displayed on a display part 48 (such as a display).

The processing unit 40 may include a calculator with a processor (such as CPU), a storage device (memory device; such as RAM), an auxiliary storage part, an interface, and the like. The processing unit 40 is configured to receive a signal (a signal indicating the current measured value or the temperature measured value) from the first current sensor 34, the second current sensor 36, and/or the temperature measurement part 38 described above via an interface. The processor is configured to process the signal thus received. In addition, the processor is configured to process programs loaded into the storage device. Whereby, the functions of the identification part 42 and the separation detection part 44 described above are realized.

The processing contents in the processing unit 40 may be implemented as programs executed by the processor. The programs may be stored in the auxiliary storage part. When executed, these programs are loaded into the storage device. The processor reads out the programs from the storage device to execute instructions included in the programs.

The processing unit 40 may be disposed inside the tower 6 or the nacelle 8 of the wind power generation facility 1. Alternatively, some or all of the functions of the processing unit 40 may be disposed outside (remote location or the like) the wind power generation facility 1.

The detection signal from the first current sensor 34, the second current sensor 36, and/or the temperature measurement part 38 may be transmitted to the processing unit 40 by a cable, an optical fiber, or radio.

Hereinafter, a monitoring method for the wind turbine blade 2 of the wind power generation facility 1 described above will be described. In the monitoring method according to some embodiments, when the wind turbine blade 2 is struck by lightning, the lightning-struck position in the wind turbine blade is identified. Further, in some embodiments, separation of the leading edge protection portion 28 disposed on the wind turbine blade 2 is detected. In the following description, an embodiment where the wind turbine blade 2 is monitored by using the above-described lightning protection system 50 will be described. However, in some embodiments, a part or a whole of the procedure to be described below may be performed manually.

(Flow for Identifying Lightning-Struck Position)

In some embodiments, when the wind turbine blade 2 is struck by lightning, the first current sensor 34 is used to measure a current flowing through the portion (blade tip-side portion) 24a, of the down conductor 24, between the blade tip 16 and the connection point 31 and to acquire the first current measured value, and the second current sensor 36 is used to measure a current flowing through the portion (blade root-side portion) 24b, of the down conductor 24, between the blade root 15 and the connection point 31 and to acquire the second current measured value.

Then, the identification part 42 identifies the lightning-struck portion of the wind turbine blade 2 based on the first current measured value and the second current measured value.

Herein, a procedure for identifying the lightning-struck portion in an embodiment will more specifically be described with reference to FIGS. 6 to 8. In the present embodiment, the identification part 42 is configured to identify the lightning-struck portion of the wind turbine blade 2 based on a magnitude relationship between the first current measured value by the first current sensor 34 and the second current measured value by the second current sensor 36.

A lightning current when lightning strikes the tip side region of the wind turbine blade 2 flows, to the connection point 31 of the down conductor 24 with the connecting conductor 30, separately into a path R1 including the blade tip-side portion 24a of the down conductor 24 and a path R2 including the connecting conductor 30. Further, since the lightning current basically flows through a shortest path to the grounding point, the magnitude of the current flowing through each of the paths described above differs according to the lightning-struck portion of the wind turbine blade 2. That is, the value of the current flowing through a path with a short distance to an installation point is relatively large. Thus, according to the lightning strike portion of the wind turbine blade 2, a current value or a current waveform of the lightning current to be measured differs between the first current sensor 34 for measuring the current in the path R1 including the blade tip-side portion 24a of the down conductor 24 described above and the second current sensor 36 for measuring the current on a downstream side of the above-described plurality of paths (the path R1 and the path R2) (that is, the blade root-side portion 24b of the down conductor 24) in a lightning current flow direction.

For example, as shown in FIG. 6, when lightning strikes the receptor 20 disposed in the tip portion 17 of the wind turbine blade 2, a path length from a lightning strike position S to the connection point 31 is shorter in the path R1 including the blade tip-side portion 24a of the down conductor 24 than in the path R2 including the connecting conductor 30. Therefore, since most of the lightning current flows to the above-described connection point 31 via the path R1 without via the path R2, there is no big difference between the first current measured value by the first current sensor 34 and the second current measured value by the second current sensor 36. On the other hand, for example, as shown in FIG. 7 or 8, when lightning strikes the leading edge protection portion 28, the path length from the lightning strike position S to the connection point 31 is shorter in the path R2 including the connecting conductor 30 than in the path R1 including the blade tip-side portion 24a of the down conductor 24. Therefore, since most of the lightning current flows to the above-described connection point 31 via the path R2 without via the path R1, the first current measured value by the first current sensor 34 is small and the second current measured value by the second current sensor 36 is large.

Therefore, if there is no big difference between the first current measured value by the first current sensor 34 and the second current measured value by the second current sensor 36, it is possible to identify that lightning has struck the receptor 20. Further, if the first current measured value by the first current sensor 34 is small and the second current measured value by the second current sensor 36 is large, it is possible to identify that lightning has struck the leading edge protection portion 28.

Furthermore, a procedure for identifying the lightning-struck portion in another embodiment will be described with reference to FIGS. 9 to 11. In the present embodiment, the identification part 42 is configured to identify the lightning-struck portion of the wind turbine blade 2 based on a magnitude relationship between the first current measured value by the first current sensor 34 and the second current measured value by each of the two second current sensors 36A, 36B.

For example, as shown in FIG. 9, when lightning strikes the receptor 20 disposed in the tip portion 17 of the wind turbine blade 2, the path length from the lightning strike position S to the connection point 31A is shorter in the path R1 including the blade tip-side portion 24a of the down conductor 24 than in a path R2a including the connecting conductor 30A. Further, a path length from the lightning strike position S to the connection point 31B is shorter in the path R1 including the blade tip-side portion 24a of the down conductor 24 than in the path R2a including the connecting conductor 30A and in a path R2b including the connecting conductor 30B. Therefore, since most of the lightning current flows to the connection point 31A and the connection point 31B described above via the path R1 without via the paths R2a, R2b, there is no big difference between the first current measured value by the first current sensor 34 and the second current measured value by each of the second current sensors 36A, 36B.

On the other hand, for example, as shown in FIG. 10, when lightning strikes the leading edge protection portion 28 (the leading edge protection members 28a to 28c in FIGS. 9 to 11) in a first tip region A1 closest to the blade tip 16 among the leading edge protection portion 28, the path length from the lightning strike position S to the connection point 31A is shorter in the path R2a including the connecting conductor 30A than in the path R1 including the blade tip-side portion 24a of the down conductor 24. Further, the path length from the lightning strike position S to the connection point 31B is shorter in the path R2a including the connecting conductor 30A and the path R2b including the connecting conductor 30B than in the path R1 including the blade tip-side portion 24a of the down conductor 24. Therefore, since most of the lightning current flows to the connection point 31A and the connection point 31B described above via the path R2a or the path R2b without via the path R1, the second current measured value by each of the second current sensors 36A, 36B is larger than the first current measured value by the first current sensor 34.

Further, for example, as shown in FIG. 11, when lightning strikes the leading edge protection portion 28 (the leading edge protection members 28d to 28g in FIGS. 9 to 11) in a second tip region A2 located closer to the blade root 15 than the first tip region A1, the path length from the lightning strike position S to the connection point 31B is the longest in the path R1 including the blade tip-side portion 24a of the down conductor 24, the second longest in the path R2a including the connecting conductor 30A, and the shortest in the path R2b including the connecting conductor 30B. Therefore, since most of the lightning current flows to the connection point 31B via the path R2b without via the paths R1 and R2a, the second current measured value by the second current sensor 36B is larger than the first current measured value by the first current sensor 34 and the second current measured value by the second current sensor 36A.

Therefore, if there is no big difference between the first current measured value by the first current sensor 34 and the second current measured value by each of the second current sensors 36A, 36B, it is possible to identify that lightning has struck the receptor 20. Further, if the second current measured value by each of the second current sensors 36A, 36B is larger than the first current measured value by the first current sensor 34, it is possible to identify that lightning has struck the leading edge protection portion 28 in the first tip region A1. Furthermore, if the second current measured value by the second current sensor 36B is larger than the first current measured value by the first current sensor 34 and the second current measured value by the second current sensor 36A, it is possible to identify that lightning has struck the leading edge protection portion 28 in the second tip region A2.

Thus, according to the above-described embodiment, it is possible to appropriately identify the lightning-struck portion of the wind turbine blade 2 based on the magnitude relationship between the first current measured value by the first current sensor 34 and the second current measured value by the second current sensor 36 (36A, 36B).

Further, in the above-described embodiment, since only the magnitude of the current is used, it is possible to identify the lightning-struck portion of the wind turbine blade 2 with a simple circuit format.

Figure 12:
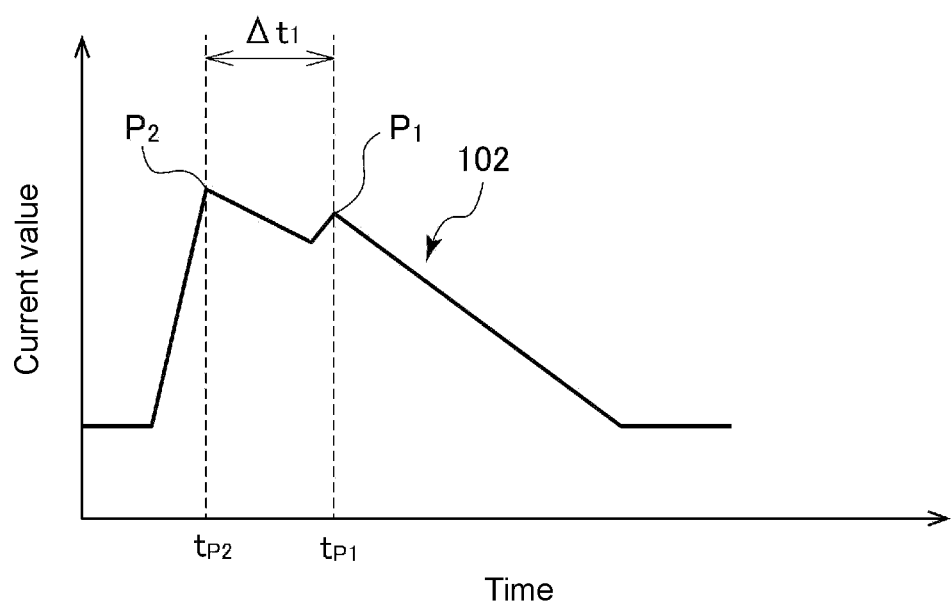
FIG. 12 is a chart showing an example of a current waveform.
Figure 13:
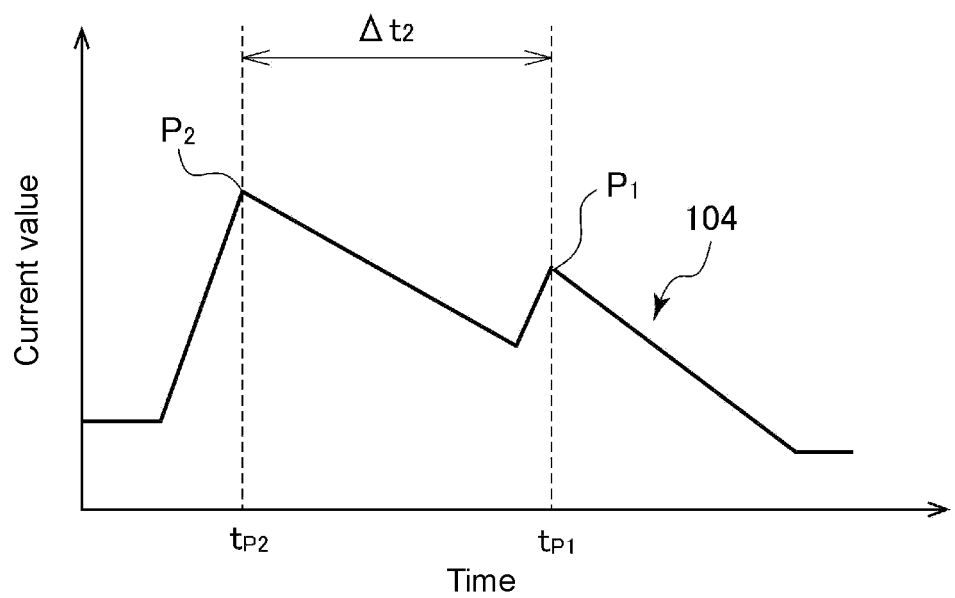
FIG. 13 is a chart showing an example of a current waveform.

In an embodiment, the identification part 42 identifies the lightning-struck portion of the wind turbine blade 2 based on a current waveform indicating a time change of the second current measured value measured by the second current sensor 36. Herein, FIGS. 12 and 13 are each a chart showing an example of the current waveform indicating the time change of the second current measured value measured by the second current sensor 36. FIG. 12 shows a current waveform 102 acquired when lightning strikes the leading edge protection member 28a located on the blade tip 16 side among the leading edge protection members 28a to 28d constituting the leading edge protection portion 28 as shown in FIG. 7. Further, FIG. 13 shows a current waveform 104 acquired when lightning strikes the leading edge protection member 28d located closer to the blade root 15 than the leading edge protection member 28a among the leading edge protection members 28a to 28d constituting the leading edge protection portion 28 as shown in FIG. 8.

The current waveform obtained from the second current measured value by the second current sensor 36 differs according to the lightning-struck portion of the wind turbine blade 2. That is, between, of the lightning current, the portion (lightning current) flowing into the downstream side of the connection point 31 via the path R1 including the blade tip-side portion 24a of the down conductor and the portion (lightning current) flowing into the downstream side of the connection point 31 via the path R2 including the connecting conductor the magnitude of the current value, timings of flowing into the blade root-side portion 24b of the down conductor 24 (the downstream portion of the connection point 31 in the lightning current flow direction), or the like are different according to the difference in the path length from the lightning-struck portion to the connection point 31.

For example, in the example shown in FIG. 7, since the lightning strike position S in the leading edge protection portion 28 is relatively on the blade tip 16 side, the difference between the length of the path R1 from the lightning strike position S including the blade tip-side portion 24a of the down conductor 24 to the connection point 31 and the length of the path R2 from the lightning strike position S including the connecting conductor 30 to the connection point 31 is relatively small. Thus, as shown in FIG. 12, in the current waveform 102, a peak time difference Δt1 is relatively small which is a difference between time $t_{P1}$ at which a peak P1 of the current value indicating the lightning current having flowed through the path R1 appears and time $t_{P2}$ at which a peak P2 of the current value indicating the lightning current having flowed through the path R2 appears.

On the other hand, in the example shown in FIG. 8, since the lightning strike position S in the leading edge protection portion 28 is relatively on the blade root 15 side, the difference between the length of the path R1 from the lightning strike position S including the blade tip-side portion 24a of the down conductor 24 to the connection point 31 and the length of the path R2 from the lightning strike position S including the connecting conductor 30 to the connection point 31 is relatively large. Thus, as shown in FIG. 13, in the current waveform 104, a peak time difference Δt2 is relatively large which is a difference between the time $t_{P1}$ at which the peak P1 of the current value indicating the lightning current having flowed through the path R1 appears and the time $t_{P2}$ at which the peak P2 of the current value indicating the lightning current having flowed through the path R2 appears.

Thus, the current waveform indicating the time change of the second current measured value acquired by the second current sensor 36 differs according to the lightning-struck portion of the wind turbine blade 2. Thus, it is possible to appropriately identify the lightning-struck portion of the wind turbine blade 2 based on the current waveform.

In an embodiment, the identification part 42 may identify the lightning-struck portion of the wind turbine blade 2 based on, in addition to the current waveform indicating the time change of the second current measured value measured by the second current sensor 36, a current waveform indicating a time change of the first current measured value measured by the first current sensor 34. Similar to the current waveform obtained from the measurement result of the second current sensor 36, the current waveform indicating the time change of the first current measured value acquired by the first current sensor 34 also differs according to the lightning-struck portion of the wind turbine blade 2. Thus, in the above-described embodiment, it is possible to appropriately identify the lightning-struck portion of the wind turbine blade 2 based on the current waveform obtained from the measurement result of the first current sensor 34 and the current waveform obtained from the measurement result of the second current sensor.

In some embodiments, the identification part identifies, based on the current waveform indicating the time change of the second current measured value, a lightning-struck leading edge protection member among the plurality of leading edge protection members constituting the leading edge protection portion 28.

Since the plurality of leading edge protection members (for example, the leading edge protection members 28a to 28d shown in FIG. 7, 8) are arranged along the blade spanwise direction, when each leading edge protection member is set as a start point, the path length to the connection point 31 via the path R1 including the blade tip-side portion 24a of the down conductor 24 and the path length to the connection point 31 via the path R2 including the connecting conductor 30 are different from each other. Consequently, the current waveforms obtained from the second current measured value when lightning strikes the respective leading edge protection members are different from each other. Thus, according to the above-described embodiment, it is possible to appropriately identify the lightning-struck leading edge protection member among the plurality of leading edge protection members (for example, the leading edge protection members 28a to 28d) based on the current waveform indicating the time change of the second current measured value.

In some embodiments, the identification part 42 is configured to identify the lightning-struck portion of the wind turbine blade 2 based on a time difference between the plurality of peaks included in the current waveform.

As described above, the timing of flowing into the connection point 31 and the downstream side thereof (the blade root-side portion 24b of the down conductor 24) is different between the lightning current via the path R1 and the lightning current via the path R2, according to the difference in the path length from the lightning-struck portion of the wind turbine blade 2. Thus, in the current waveform indicating the time change of the second current measured value, the time difference between the peaks, which indicate the lightning currents having passed through the respective paths, corresponds to the difference in path length between the respective lightning currents.

For example, as shown in FIG. 7, assuming that the peak time difference is known to be Δt1 (see FIG. 12) when lightning strikes the leading edge protection member 28a on the blade tip 16 side, it is possible to identify that the lightning-struck portion is the leading edge protection member 28a if the peak time difference, which appears in the current waveform acquired from the second current measured value when lightning strikes the wind turbine blade 2, is approximately the same as the above-described Δt1. Further, as shown in FIG. 8, assuming that the peak time difference is known to be Δt2 (see FIG. 13) when lightning strikes the leading edge protection member 28d on the blade root 15 side, it is possible to identify that the lightning-struck portion is the leading edge protection member 28d if the peak time difference, which appears in the current waveform acquired from the second current measured value when lightning strikes the wind turbine blade 2, is approximately the same as the above-described Δt2.

Thus, according to the above-described embodiment, it is possible to appropriately identify the lightning-struck portion of the wind turbine blade 2 based on the time difference between the plurality of peaks included in the current waveform.

In some embodiments, the identification part 42 is configured to identify the lightning-struck portion of the wind turbine blade 2 based on a waveform comparison between the current waveform, which is obtained from the second current measured value measured by the second current sensor 36 when the wind turbine blade 2 is struck by lightning, and a reference current waveform which is acquired in advance by using the second current sensor 36 and associated with the lightning-struck position in the wind turbine blade 2.

As a result of intensive studies by the present inventors, it was found that when lightning strikes multiple times the same lightning strike position in the specific wind turbine blade 2, current waveforms similar to each other are obtained based on the measurement result of the second current sensor 36. In this regard, with the above configuration, since the waveform comparison is performed between the current waveform, which is obtained at the time of actual lightning, and the reference current waveform which is acquired in advance by using the second current sensor 36 and associated with the lightning-struck position in the wind turbine blade 2, it is possible to appropriately identify the lightning-struck portion of the wind turbine blade.

Figure 14:
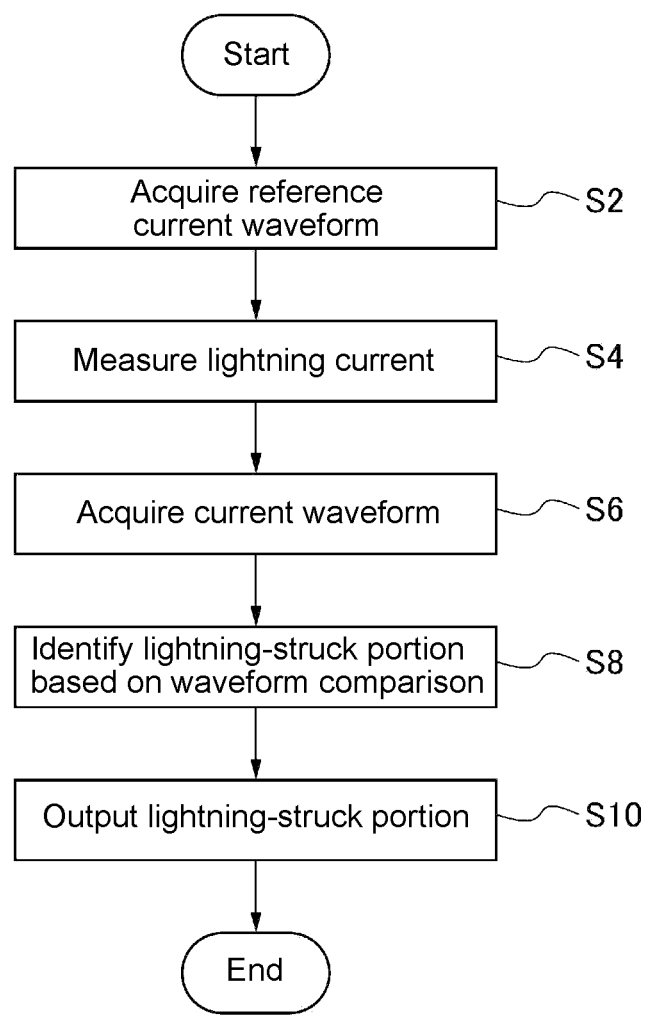
FIG. 14 is a flowchart showing a monitoring method for the wind turbine blade according to an embodiment.

A procedure for identifying the lightning-struck portion based on the above-described waveform comparison will be described with reference to the flowchart shown in FIG. 14. FIG. 14 is a flowchart showing a monitoring method for the wind turbine blade 2 according to an embodiment.

First, before the operation of the wind power generation facility 1, lightning strokes are applied to a plurality of lightning-struck positions (for example, the receptor 20 and the leading edge protection members 28a to 28d) in the wind turbine blade 2 in an experimental facility or the like, and the current value is measured by using the second current sensor 36. Based on the measurement result, a current waveform corresponding to each of the plurality of lightning-struck positions is acquired and stored as a reference current waveform in a storage part 46 (see FIG. 5) (S2). Herein, the lightning strokes may be applied multiple times to each lightning-struck position, and the reference current waveform may be acquired for each lightning stroke (that is, the plurality of reference current waveforms may be acquired for one lightning-struck position). Further, a current waveform obtained by normalizing the current waveform obtained based on the current measurement result (that is, a current waveform obtained by adjusting a peak value in the current waveform to be a defined value) may be used as the reference current waveform. The storage part 46 may be an auxiliary storage device or a main storage device for the processing unit 40, or may be disposed in an environment remote from the processing unit 40.

Next, during the operation of the wind power generation facility 1 in which the wind turbine blade 2 used in step S2 is installed, when lightning strikes the wind turbine blade 2, the lightning current is measured by using the second current sensor 36 (S4), and the current waveform is acquired based on the second current measured value which is the measurement result of S4 (S6). Steps S4 and S6 may further include measuring the first current measured value by using the first current sensor 34 and acquiring the current waveform based on the first current measured value.

Next, the waveform comparison is performed between the plurality of reference current waveforms, which are obtained in step S2 and correspond to the plurality of lightning-struck positions, and the current waveform obtained in step S6, and the lightning-struck portion of the wind turbine blade 2 is identified based on the result of the waveform comparison (S8). In step S8, the reference current waveform obtained by the above-described normalization in step S2 and the current waveform which is obtained by normalizing the current waveform obtained in step S6 may be subjected to the waveform comparison.

The waveform comparison in step S8 may be performed by obtaining a correlation value between each of the reference current waveforms obtained in step S2 and the current waveform obtained in step S6. Further, if the magnitude of the correlation value is not less than a threshold, it may be estimated (identified) that lightning has struck the lightning-struck position (for example, any of the leading edge protection members 28a to 28d and the receptor corresponding to the reference current waveform in question.

Then, the lightning-struck portion identified in step S8 is output to the display part 48 or the like (S10).

Thus, it is possible to identify the lightning-struck portion of the wind turbine blade 2. Further, by outputting the identified lightning-struck portion to the display part 48 or the like, an operator or the like can quickly know the lightning-struck position in the wind turbine blade 2 and can quickly take countermeasures such as repair.

In some embodiments, the identification part 42 may identify the lightning-struck portion of the wind turbine blade 2 by using a prediction model that uses the current waveform obtained from the second current measured value by the second current sensor 36 as an input and the lightning-struck position in the wind turbine blade 2 as an output.

In the above-described embodiment, it is possible to appropriately identify the lightning-struck portion of the wind turbine blade 2 by using the prediction model that uses the current waveform obtained from the second current measured value by the second current sensor 36 as the input and the lightning-struck position in the wind turbine blade 2 as the output. The prediction model may be a learned model that has already been machine-learned by applying the lightning strokes to the plurality of lightning-struck positions in the wind turbine blade 2 in the experimental facility or the like. Further, it is possible to improve the accuracy of identifying the lightning-struck portion of the wind turbine blade 2, by re-learning the prediction model based on an observation result in an actual operating environment.

(Flow for Detecting Separation of Leading Edge Protection Portion)

A flow for detecting separation of the leading edge protection portion according to some embodiments will be described.

In an embodiment, the temperature measurement part 38 measures the temperature distribution of the leading edge protection portion 28. Herein, if the leading edge protection portion 28 is constituted by the plurality of leading edge protection members, the temperature of each leading edge protection member may be measured.

Next, the separation detection part 44 (see FIG. 5) is configured to detect separation of the leading edge protection portion 28 based on the temperature distribution measured by the temperature measurement part 38.

The leading edge protection portion 28 made of the metal tends to have higher temperature than the blade body of the wind turbine blade 2 due to sunlight or the like. Then, if the leading edge protection portion 28 adhered to the blade body 10 is partially separated, heat transfer from the leading edge protection portion to the base material (blade body) is reduced at the separated portion, and the temperature tends to be high relative to a peripheral region of the separated portion.

Therefore, if the temperature distribution acquired by the temperature measurement part 38 includes the portion, of the leading edge protection portion 28, which has the higher temperature than the peripheral region, the separation detection part 44 can estimate (identify) that the separation is occurring in the said portion. Alternatively, if the temperature distribution acquired by the temperature measurement part 38 includes the leading edge protection member which has a higher temperature than the other leading edge protection members among the plurality of leading edge protection members (for example, the leading edge protection members 28a to 28d) constituting the leading edge protection portion 28, the separation detection part 44 can estimate (identify) that the said leading edge protection member is separated.

Thus, in the above-described embodiment, since the temperature distribution of the leading edge protection portion 28 is measured by the temperature measurement part 38, the separation of the leading edge protection portion 28 can be detected based on the measured temperature distribution.

The contents described in the above embodiments would be understood as follows, for instance.

(1) A lightning protection system (50) for a wind turbine blade (2) according to at least one embodiment of the present invention, includes: a receptor (20) disposed in a tip portion (17) of the wind turbine blade; a leading edge protection portion (28) made of a metal and electrically connected to the receptor and disposed so as to cover a leading edge (11) of the wind turbine blade; a down conductor (24) connected to the receptor; at least one connecting conductor (30) for electrically connecting the leading edge protection portion and the down conductor at a position between the receptor and a blade root (15) in a blade spanwise direction of the wind turbine blade; a first current sensor (34) for measuring a current flowing through a portion (24a), of the down conductor, between a blade tip and a connection point (31) with the at least one connecting conductor in the blade spanwise direction; at least one second current sensor disposed corresponding to the at least one connecting conductor, the at least one second current sensor being configured to measure a current flowing through a portion (24b), of the down conductor, between the blade root and the connection point; and an identification part (42) configured to identify a lightning-struck portion of the wind turbine blade based on a first current measured value which is a current measured value by the first current sensor and a second current measured value which is a current measured value by the second current sensor.

In the above configuration (1), the connecting conductor is provided which is configured to electrically connect the leading edge protection portion and the down conductor at the position between the receptor and the blade root. Therefore, the lightning current when lightning strikes the tip side region of the wind turbine blade flows, to the connection point of the down conductor with the connecting conductor, separately into a path (R1) including the blade tip-side portion of the down conductor and a path (R2) including the connecting conductor. Further, since the lightning current basically flows through the shortest path to the grounding point, the magnitude of the current flowing through each of the paths described above differs according to the lightning-struck portion of the wind turbine blade. Thus, according to the lightning strike portion of the wind turbine blade, the current value or the current waveform of the lightning current to be measured differs between the first current sensor for measuring the current in the path (R1) including the blade tip-side portion of the down conductor described above and the second current sensor for measuring the current on the downstream side of the above-described plurality of paths (the path R1 and the path R2) (the downstream side of the above-described connection point) in the lightning current flow direction. Thus, with the above configuration (1), it is possible to identify the lightning-struck portion of the wind turbine blade based on the first current measured value acquired by the first current sensor and the second current measured value by the second current sensor.

(2) In some embodiments, in the above configuration (1), the identification part is configured to identify the lightning-struck portion of the wind turbine blade based on a magnitude relationship between the first current measured value and the second current measured value.

As described in the above (1), the current value of the lightning current to be measured differs between the first current sensor and the second current sensor, according to the lightning-struck portion of the wind turbine blade. For example, if lightning strikes the receptor, since most of the lightning current flows to the above-described connection point via the path (R1) including the blade tip-side portion of the down conductor without via the path (R2) including the connecting conductor, there is no big difference between the current value measured by the first current sensor and the current value measured by the second current sensor. On the other hand, if lightning strikes the leading edge protection portion, since most of the lightning current flows to the above-described connection point via the path (R2) including the connecting conductor without via the path (R1) including the blade tip-side portion of the down conductor, the current value measured by the first current sensor is small and the current value measured by the second current sensor is large. Thus, with the above configuration (2), it is possible to appropriately identify the lightning-struck portion of the wind turbine blade based on the magnitude relationship between the first current measured value by the first current sensor and the second current measured value by the second current sensor.

Further, in the above configuration (2), since only the magnitude of the current is used, it is possible to identify the lightning-struck portion of the wind turbine blade with a simple circuit format.

(3) In some embodiments, in the above configuration (1) or (2), the identification part is configured to identify the lightning-struck portion of the wind turbine blade based on a current waveform (such as the above-described current waveform 102 or 104, etc.) indicating a time change of the second current measured value.

The current waveform obtained from the second current measured value by the second current sensor differs according to the lightning-struck portion of the wind turbine blade. For example, as described above, since the lightning current basically flows through the shortest path to the grounding point, the magnitude of the current differs between, of the lightning current, the portion (lightning current) flowing into the downstream side of the connection point via the path (R1) including the blade tip-side portion of the down conductor and the portion (lightning current) flowing into the downstream side of the connection point via the path (R2) including the connecting conductor, according to the lightning-struck portion of the wind turbine blade. Further, the timing of flowing into the connection point and the downstream side thereof is different between the lightning current via the above-described path (R1) and the lightning current via the above-described path (R2), according to the difference in the path length of the lightning current, which passes through each path, from the lightning-struck portion. Thus, with the above configuration (3), it is possible to appropriately identify the lightning-struck portion of the wind turbine blade based on the current waveform indicating the time change of the second current measured value acquired by the second current sensor.

(4) In some embodiments, in the above configuration (3), the leading edge protection portion includes a plurality of leading edge protection members (such as the above-described leading edge protection members 28a to 28g) arranged along the blade spanwise direction, and the identification part is configured to identify a lightning-struck leading edge protection member among the plurality of leading edge protection members based on the current waveform indicating the time change of the second current measured value.

In the above configuration (4), since the plurality of leading edge protection members are arranged along the blade spanwise direction, when each leading edge protection member is set as a start point, the path length to the connection point via the path (R1) including the blade tip-side portion of the down conductor and the path length to the connection point via the path (R2) including the connecting conductor are different from each other. Consequently, the current waveforms obtained from the second current measured value when lightning strikes the respective leading edge protection members are different from each other. Thus, with the above configuration (4), it is possible to appropriately identify the lightning-struck leading edge protection member among the plurality of leading edge protection members based on the current waveform indicating the time change of the second current measured value.

(5) In some embodiments, in the above configuration (3) or (4), the identification part is configured to identify the lightning-struck portion of the wind turbine blade based on a time difference (such as the above-described $\Delta t1$ or $\Delta t2$) between a plurality of peaks included in the current waveform.

As described above, the timing of flowing into the connection point and the downstream side thereof is different between the lightning current via the path (R1) including the blade tip-side portion of the down conductor and the lightning current via the path (R2) including the connecting conductor, according to the difference in the path length from the lightning-struck portion of the wind turbine blade. Thus, in the current waveform indicating the time change of the second current measured value, the time difference between the peaks, which indicate the lightning currents having passed through the respective paths, corresponds to the difference in path length between the respective lightning currents. Thus, with the above configuration (5), it is possible to appropriately identify the lightning-struck portion of the wind turbine blade based on the time difference between the plurality of peaks included in the current waveform.

(6) In some embodiments, in the above configuration (3) or (4), the identification part is configured to identify the lightning-struck portion of the wind turbine blade based on a waveform comparison between the current waveform and a reference current waveform acquired in advance by using the at least one second current sensor and associated with a lightning-struck position in the wind turbine blade.

As a result of intensive studies by the present inventors, it was found that when lightning strikes multiple times the same lightning strike position in the specific wind turbine blade, current waveforms similar to each other are obtained based on the measurement result of the second current sensor. In this regard, with the above configuration (6), since the waveform comparison is performed between the current waveform, which is obtained at the time of actual lightning, and the reference current waveform which is acquired in advance by using the second current sensor and associated with the lightning-struck position in the wind turbine blade, it is possible to appropriately identify the lightning-struck portion of the wind turbine blade.

(7) In some embodiments, in the above configuration (3) or (4), the identification part is configured to identify the lightning-struck portion of the wind turbine blade by using a prediction model that uses the current waveform as an input and a lightning-struck position in the wind turbine blade as an output.

As a result of intensive studies by the present inventors, it was found that when lightning strikes multiple times the same lightning strike position in the specific wind turbine blade, current waveforms similar to each other are obtained based on the measurement result of the second current sensor. In this regard, with the above configuration (7), since the prediction model is used which uses the current waveform as the input and the lightning-struck position in the wind turbine blade as the output, it is possible to appropriately identify the lightning-struck portion of the wind turbine blade.

(8) In some embodiments, in any one of the above configurations (1) to (7), the lightning protection system for the wind turbine blade includes: a temperature measurement part (temperature measurement part 38) configured to measure a temperature distribution of the leading edge protection portion; and a separation detection part (44) configured to detect separation of the leading edge protection portion based on the temperature distribution measured by the temperature measurement part.

The leading edge protection portion made of the metal tends to have higher temperature than the blade body of the wind turbine blade due to sunlight or the like. Then, if the leading edge protection portion adhered to the blade body is partially separated, heat transfer from the leading edge protection portion to the base material (blade body) is reduced at the separated portion, and the temperature tends to be high relative to a peripheral region of the separated portion. In this regard, in the above configuration (8), since the temperature distribution of the leading edge protection portion is measured by the temperature measurement part, the separation of the leading edge protection portion can be detected based on the measured temperature distribution.

(9) A wind power generation facility (1) according to at least one embodiment of the present invention includes: a wind turbine rotor (5) including a wind turbine blade; and a generator configured to be driven by rotation of the wind turbine rotor; and the lightning protection system (50) according to any one of the above (1) to (8).

In the above configuration (9), the connecting conductor is provided which is configured to electrically connect the leading edge protection portion and the down conductor at the position between the receptor and the blade root. Therefore, the lightning current when lightning strikes the tip side region (the region on the blade tip side relative to the connection point of the down conductor with the connecting conductor) of the wind turbine blade flows, to the connection point of the down conductor with the connecting conductor, separately into the path including the blade tip-side portion of the down conductor and the path including the connecting conductor. Further, since the lightning current basically flows through the shortest path to the grounding point, the magnitude of the current flowing through each of the paths described above differs according to the lightning-struck portion of the wind turbine blade. Thus, according to the lightning strike portion of the wind turbine blade, the current value or the current waveform of the lightning current to be measured differs between the first current sensor for measuring the current in the path including the blade tip-side portion of the down conductor described above and the second current sensor for measuring the current on the downstream side of the above-described plurality of paths (the downstream side of the above-described connection point) in the lightning current flow direction. Thus, with the above configuration (9), it is possible to identify the lightning-struck portion of the wind turbine blade based on the first current measured value acquired by the first current sensor and the second current measured value by the second current sensor.

(10) A monitoring method for a wind turbine blade according to at least one embodiment of the present invention is a monitoring method for a wind turbine including: a receptor (20) disposed in a tip portion (17) of the wind turbine blade (2); a leading edge protection portion (28) made of a metal and electrically connected to the receptor and disposed so as to cover a leading edge of the wind turbine blade; a down conductor (24) connected to the receptor; and a connecting conductor (30) for electrically connecting the leading edge protection portion and the down conductor at a position between the receptor and a blade root in a blade spanwise direction of the wind turbine blade, the monitoring method for the wind turbine blade, including: a step of measuring, with a first current sensor, a current flowing through a portion, of the down conductor, between a blade tip and a connection point (31) with the connecting conductor in the blade spanwise direction; a step of measuring, with a second current sensor, a current flowing through a portion, of the down conductor, between the blade root and the connection point; and a step of identifying a lightning-struck portion of the wind turbine blade based on a first current measured value by the first current sensor and a second current measured value by the second current sensor.

In the above method (10), the connecting conductor is provided which is configured to electrically connect the leading edge protection portion and the down conductor at the position between the receptor and the blade root. Therefore, the lightning current when lightning strikes the tip side region (the region on the blade tip side relative to the connection point of the down conductor with the connecting conductor) of the wind turbine blade flows, to the connection point of the down conductor with the connecting conductor, separately into the path including the blade tip-side portion of the down conductor and the path including the connecting conductor. Further, since the lightning current basically flows through the shortest path to the grounding point, the magnitude of the current flowing through each of the paths described above differs according to the lightning-struck portion of the wind turbine blade. Thus, according to the lightning strike portion of the wind turbine blade, the current value or the current waveform of the lightning current to be measured differs between the first current sensor for measuring the current in the path including the blade tip-side portion of the down conductor described above and the second current sensor for measuring the current on the downstream side of the above-described plurality of paths (the downstream side of the above-described connection point) in the lightning current flow direction. Thus, with the above method (10), it is possible to identify the lightning-struck portion of the wind turbine blade based on the first current measured value acquired by the first current sensor and the second current measured value by the second current sensor.

(11) A monitoring method for a wind turbine blade according to at least one embodiment of the present invention is a monitoring method for a wind turbine including: a receptor (20) disposed in a tip portion (17) of the wind turbine blade (2); a leading edge protection portion (28) made of a metal and electrically connected to the receptor and disposed so as to cover a leading edge of the wind turbine blade; a down conductor (24) connected to the receptor; and a connecting conductor (30) for electrically connecting the leading edge protection portion and the down conductor at a position between the receptor and a blade root in a blade spanwise direction of the wind turbine blade, the monitoring method for the wind turbine blade, including: a step of measuring, with a second current sensor, a current flowing through a portion, of the down conductor, between the blade root and a connection point (31) with the connecting conductor; a step of acquiring a current waveform indicating a time change of a second current measured value by the second current sensor; and a step of identifying a lightning-struck portion of the wind turbine blade based on the current waveform.

The current waveform obtained from the second current measured value by the second current sensor differs according to the lightning-struck portion of the wind turbine blade. For example, as described above, since the lightning current basically flows through the shortest path to the grounding point, the magnitude of the current differs between, of the lightning current, the portion (lightning current) flowing into the downstream side of the connection point via the path (R1) including the blade tip-side portion (24a) of the down conductor and the portion (lightning current) flowing into the downstream side of the connection point via the path (R2) including the connecting conductor 30, according to the lightning-struck portion of the wind turbine blade. Further, the timing of flowing into the connection point and the downstream side thereof is different between the lightning current via the above-described path (R1) and the lightning current via the above-described path (R2), according to the difference in the path length of the lightning current, which passes through each path, from the lightning-struck portion. Thus, with the above configuration (11), it is possible to appropriately identify the lightning-struck portion of the wind turbine blade based on the current waveform indicating the time change of the second current measured value acquired by the second current sensor.

Embodiments of the present invention were described in detail above, but the present invention is not limited thereto, and also includes an embodiment obtained by modifying the above-described embodiments and an embodiment obtained by combining these embodiments as appropriate.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, an expression of a shape such as a rectangular shape or a cylindrical shape shall not be construed as only the geometrically strict shape, but also includes a shape with unevenness or chamfered corners within the range in which the same effect can be achieved.

As used herein, the expressions "comprising", "including" or "having" one constitutional element is not an exclusive expression that excludes the presence of other constitutional elements.

REFERENCE SIGNS LIST

1 Wind power generation facility
2 Wind turbine blade
4 Hub
5 Rotor
6 Tower
8 Nacelle
10 Blade body
10a Shell
11 Leading edge
12 Trailing edge
15 Blade root
16 Blade tip
17 Tip portion
20 Receptor
24 Down conductor
24a Blade tip-side portion
24b Blade root-side portion
26 Down conductor
28 Leading edge protection portion
28a to 28g Leading edge protection member
30, 30A, 30B Connecting conductor
31, 31A, 31B Connection point
32 Connection point
34 First current sensor
36, 36A, 36B Second current sensor
38 Temperature measurement part 40 Processing unit
42 Identification part
44 Separation detection part
46 Storage part
48 Display part
50 Lightning protection system
102, 104 Current waveform
A1 First tip region
A2 Second tip region
S Lightning strike position

The invention claimed is:

1. A lightning protection system for a wind turbine blade, comprising:
 a receptor disposed in a tip portion of the wind turbine blade;
 a leading edge protection portion made of a metal and electrically connected to the receptor and disposed so as to cover a leading edge of the wind turbine blade;
 a down conductor connected to the receptor;
 at least one connecting conductor for electrically connecting the leading edge protection portion and the down conductor at a position between the receptor and a blade root in a blade spanwise direction of the wind turbine blade;
 a first current sensor for measuring a current flowing through a blade tip-side portion of the down conductor, wherein the blade tip-side portion is between a blade tip and a connection point with the at least one connecting conductor in the blade spanwise direction;
 at least one second current sensor disposed corresponding to the at least one connecting conductor, the at least one second current sensor being configured to measure a current flowing through a portion of the down conductor, between the blade root and the connection point; and
 a processor configured to identify a lightning-struck portion of the wind turbine blade based on a first current measured value which is a current measured value by the first current sensor and a second current measured value which is a current measured value by the at least one second current sensor, wherein
 the processor is configured to identify whether the receptor or the leading edge protection portion is the lightning-struck portion of the wind turbine blade based on a magnitude relationship between the first current measured value and the second current measured value.

2. The lightning protection system for the wind turbine blade according to claim 1, wherein the processor is configured to identify the lightning-struck portion of the wind turbine blade based on a current waveform indicating a time change of the second current measured value.

3. The lightning protection system for the wind turbine blade according to claim 2,
 wherein the leading edge protection portion includes a plurality of leading edge protection members arranged along the blade spanwise direction, and
 wherein the processor is configured to identify a lightning-struck leading edge protection member among the plurality of leading edge protection members based on the current waveform indicating the time change of the second current measured value.

4. The lightning protection system for the wind turbine blade according to claim 2, wherein the processor is configured to identify the lightning-struck portion of the wind turbine blade based on a time difference between a plurality of peaks included in the current waveform.

5. The lightning protection system for the wind turbine blade according to claim 2, wherein the processor is configured to identify the lightning-struck portion of the wind turbine blade based on a waveform comparison between the current waveform and a reference current waveform acquired in advance by using the at least one second current sensor and associated with a lightning-struck position in the wind turbine blade.

6. The lightning protection system for the wind turbine blade according to claim 2, wherein the processor is configured to identify the lightning-struck portion of the wind turbine blade by using a prediction model that uses the current waveform as an input and a lightning-struck position in the wind turbine blade as an output.

7. The lightning protection system for the wind turbine blade according to claim 1, comprising:
 a thermograph configured to measure a temperature distribution of the leading edge protection portion; and
 the processor is further configured to detect separation of the leading edge protection portion based on the temperature distribution measured by the thermograph.

8. A wind power generation facility, comprising:
 a wind turbine rotor including a wind turbine blade;
 a generator configured to be driven by rotation of the wind turbine rotor; and
 the lightning protection system according to claim 1.

9. The lightning protection system for the wind turbine blade according to claim 1, comprising:
 a first path which is a current path from the receptor to the connection point and includes the blade tip-side portion of the down conductor; and
 a second path which is a current path from the receptor to the connection point and includes the at least one connecting conductor.

10. The lightning protection system for the wind turbine blade according to claim 9, wherein the first path has a shorter length than the second path.

11. The lightning protection system for the wind turbine blade according to claim 1, wherein the lightning protection system for the wind turbine blade is configured such that a lightning current when lightning strikes the tip portion flows, from the receptor to the connection point, separately into a first path including the blade tip-side portion of the down conductor and a second path including the at least one connecting conductor.

12. The lightning protection system for the wind turbine blade according to claim 1,
 wherein the leading edge protection portion includes a plurality of leading edge protection members arranged along the blade spanwise direction, and
 wherein a pair of adjacent leading edge protection members among the plurality of leading edge protection members are electrically connected.

13. The lightning protection system for the wind turbine blade according to claim 12, wherein the at least one connecting conductor includes a connecting conductor for connecting the down conductor to a leading edge protection member located closest to the blade root in the blade spanwise direction among the plurality of leading edge protection members.

14. The lightning protection system for the wind turbine blade according to claim 12, wherein
 the at least one connecting conductor includes:
  a first connecting conductor for connecting the down conductor to a leading edge protection member located closer to the blade root in the blade spanwise direction than a leading edge protection member disposed closest to the blade tip among the plurality of leading edge protection members; and a second connecting conductor for connecting the down conductor to a leading edge protection member located closer to the blade root in the blade spanwise direction than the leading edge protection member connected to the first connecting conductor.

15. The lightning protection system for the wind turbine blade according to claim 1, wherein the at least one connecting conductor penetrates a blade body including a shell constituting the wind turbine blade and extends inside the blade body.

16. A monitoring method for a wind turbine blade, the wind turbine blade including: a receptor disposed in a tip portion of the wind turbine blade; a leading edge protection portion made of a metal and electrically connected to the receptor and disposed so as to cover a leading edge of the wind turbine blade; a down conductor connected to the receptor; and a connecting conductor for electrically connecting the leading edge protection portion and the down conductor at a position between the receptor and a blade root in a blade spanwise direction of the wind turbine blade, the monitoring method for the wind turbine blade, comprising:

a step of measuring, with a first current sensor, a current flowing through a portion of the down conductor, between a blade tip and a connection point with the connecting conductor in the blade spanwise direction;

a step of measuring, with a second current sensor, a current flowing through a portion of the down conductor, between the blade root and the connection point; and a step of identifying a lightning-struck portion of the wind turbine blade based on a first current measured value by the first current sensor and a second current measured value by the second current sensor, wherein the step of identifying a lightning-struck portion comprises identifying whether the receptor or the leading edge protection portion is the lightning-struck portion of the wind turbine blade based on a magnitude relationship between the first current measured value and the second current measured value.

17. A monitoring method for a wind turbine blade, the wind turbine blade including: a receptor disposed in a tip portion of the wind turbine blade; a leading edge protection portion made of a metal and electrically connected to the receptor and disposed so as to cover a leading edge of the wind turbine blade; a down conductor connected to the receptor; and a connecting conductor for electrically connecting the leading edge protection portion and the down conductor at a position between the receptor and a blade root in a blade spanwise direction of the wind turbine blade, the monitoring method for the wind turbine blade, comprising:

a step of measuring, with a second current sensor, a current flowing through a portion of the down conductor, between the blade root and a connection point with the connecting conductor;

a step of acquiring a current waveform indicating a time change of a second current measured value by the second current sensor; and a step of identifying a lightning-struck portion of the wind turbine blade based on the current waveform.

* * * * *